Aug. 8, 1933.  L. J. KINNARD  1,921,572
ARC WELDING MACHINE
Filed Aug. 24, 1931

Inventor
Luther J. Kinnard
By Lyon & Lyon
Attorneys

Patented Aug. 8, 1933

1,921,572

UNITED STATES PATENT OFFICE 1,921,572

ARC WELDING MACHINE

Luther J. Kinnard, Pasadena, Calif., assignor to Consolidated Steel Corporation, Ltd., Los Angeles, Calif., a Corporation of California Application August 24, 1931. Serial No. 558,967

3 Claims. (Cl. 219—8)

My invention relates to arc welding machines, and has particular reference to a method and means of controlling the directional characteristic of an arc employed for forming a continuous weld between two pieces of metal.

In the practice of arc welding, such as the welding of the seam on a section of pipe, considerable difficulty is encountered in forming a uniform weld throughout the length of the pipe, there being a tendency for the weld to be weaker at the starting end of the weld and also at the finishing end of the weld by reason of the magnetic reaction set up by current flowing through the electrode and the effect of this magnetic field upon the metal to be welded.

For example, upon the starting of the arc, the metal to be welded is cold and hence it is desirable that additional heat should be applied to the metal at this point in order to bring its temperature up to a degree corresponding to the degree of heat which would normally surround the metal on the other side of the arc as it progresses along the line of the weld. The normal tendency of an arc is to trail the electrode. That is, the normal tendency is for the arc to blow back slightly to the rear of the perpendicular between the point of the arc and the plane of the weld. This tendency causes the arc to be unstable and may cause the arc to break if the speed of movement of the electrode is sufficiently great.

It is, therefore, an object of my invention to provide a means for directing the arc either forwardly or rearwardly of the perpendicular to permit regulation and stabilization of the arc.

Another object of my invention is to provide a device for magnetically influencing the directional characteristic of the arc which tends to reduce the rotational characteristic of the arc and tends to direct the arc in the most effective direction for any particular welding condition.

Another object of my invention is to provide a device for selectively directing the arc either forwardly or rearwardly of the perpendicular to permit an operator to control the preheating or subheating of the material to be welded, in accordance with conditions existing at any particular portion of the weld.

Another object of my invention is to provide a magnetic arc directing means which may be variably controlled to either reverse the directional characteristic of the arc, or to vary the directional characteristic between an extreme forward position to an extreme rearward position.

Other objects and advantages will be apparent from a study of the following specifications, read in connection with the accompanying drawing, wherein Fig. 1 is a vertical, sectional view through a portion of an automatic welding head equipped with an arc directing device in accordance with my invention;

Figure 1:
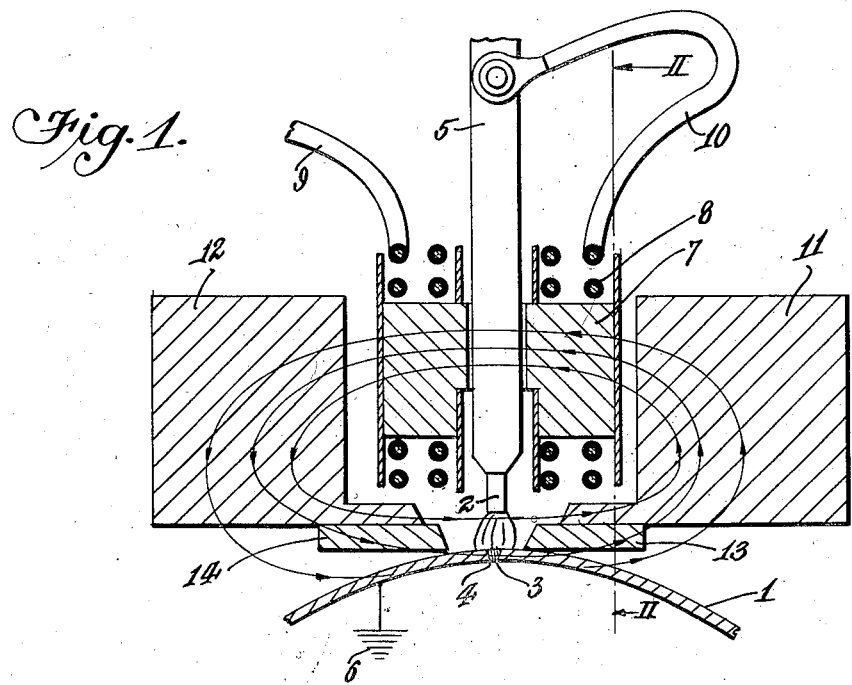

Referring to the drawing, I have illustrated a section of pipe 1 as the material to be welded, which is moved longitudinally beneath an electrode 2 so that an arc may be struck between the electrode 2 and the metal 1 to be welded. For example, the metal 1 may constitute a length of pipe which is to be welded by the electric arc in which case either the pipe 1 may be moved relative to the electrode, or the electrode may be moved over the length of pipe to weld the abutting edges 3 and 4 of the pipe together along a longitudinal seam.

The electrode 2 is illustrated as being fed through a suitable clamp 5 to which may be connected one conductor of a suitable source of welding current, the other terminal of the source being connected to ground so that by connecting the pipe 2 to ground, as is indicated at 6, a complete circuit may be made, including the arc between the electrode 2 and the pipe 1.

Normally the current which is passing through the electrode 2 sets up a magnetic field tending to deflect the arc, and since the magnetic field substantially rotates, there is a tendency for the arc to rotate, that is, for the arc to describe a circle around the perpendicular between the electrode 2 and the pipe 1. This tendency may be counteracted by providing an auxiliary magnetic field surrounding the arc. For example, the auxiliary magnetic field may be accomplished by providing a substantially U-shaped core 7 provided with a winding of conducting wire 8 wound in a direction parallel to the longitudinal axis of the pipe to be welded. The coil of conducting wire 8 may be interposed in the circuit of the arc between the electrode and the pipe as by connecting a conductor 9, constituting one end of the coil 8, to the source of welding current, and by connecting the other end 10 of the coil 8 to the clamp 5, so that all of the welding current supplied to the arc passes through the coil 8. Such current will set up a magnetic field in the core 7 which is transverse to the magnetic field set up by the current passing through the electrode 2.

The magnetic field in the core 7 may be led through suitable pole pieces 11 and 12, placed upon opposite sides of the arc, so that this magnetic field is led into juxtaposition with the arc and preferably a portion of the magnetic field is so directed as to pass through the pipe or other material to be welded across the gap between the pieces of metal to be welded. If desired, auxiliary pole shoes 13 and 14 may be provided, respectively, on the pole pieces 11 and 12 to concentrate the magnetic field close to the arc.

The effect of the auxiliary magnetic field will be to oppose the rotary magnetic field normally surrounding the arc, and thus will tend to direct the arc forwardly or rearwardly depending upon the polarization of the auxiliary magnetic field. For example, with the poles of the auxiliary magnetic field in a given direction, the tendency is to blow the arc back to the rear of the perpendicular between the electrode and the material to be welded, while if the magnetic poles are reversed, the tendency is to blow the arc forward of the perpendicular.

Figure 4:
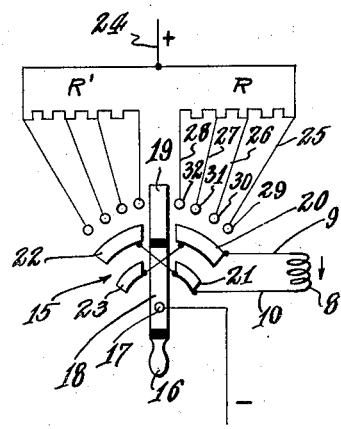
Fig. 4 is a diagrammatic view, illustrating the control for reversing and variably controlling the magnetic arc directing device.
Figure 3:
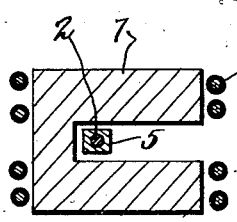
Fig. 3 is a detail, horizontal sectional view, taken along line III—III of Fig. 2.

I prefer to provide a controlling device in the circuit of the coil 8 so as to permit the control of the polarization of the magnetic field, as well as to control the strength of this magnetic field. For example, the circuit may be as is illustrated in Fig. 4, in which is illustrated a reversing switch structure 15 comprising a suitable handle 16, pivoted at 17 and carrying movable contact pieces 18 and 19. Stationary contact pieces 20 and 21 are illustrated as connected, respectively, to the conductors 9 and 10, constituting the terminals of the coil 8.

Similar stationary contact pieces 22 and 23 are also provided engageable by the movable contact pieces 19 and 18, respectively, the contact pieces 22 and 23 being cross-connected, respectively, with contact pieces 21 and 20 so that when the handle 16 is moved in a clockwise direction current will be supplied from contact piece 19 to contact piece 20, thence through the coil in the direction of the arrow, and thence to conductor 21 and to contact piece 18 to the opposite side of the line, or, in this case, to the clamp 5, which constitutes the connection between the electrode and the source of power. On the other hand, when the handle 16 is moved in a counterclockwise direction, current will pass from contact piece 19, through contact piece 22, thence to contact piece 21 and through the coil 8 in the direction opposite to the arrow, thence through contact piece 20 and contact piece 23 to the contact piece 18, and thence to the clamp 5. Thus it will be understood that the direction of current through the coil 8 may be reversed by moving the handle 16 either in a clockwise or counterclockwise direction.

For the purpose of permitting control of the strength of the magnetic field, suitable resistors R and R' may be provided connected as illustrated to the terminal 24 of the source of welding current. The resistor R is illustrated as having provided thereon a plurality of taps 25, 26, 27 and 28 which are in turn connected to the contact pieces 29, 30, 31 and 32, which are so mounted as to be engageable by the movable contact 19.

Thus when the handle 16 is moved in a clockwise direction a sufficient distance to contact with contact piece 20, it will also engage contact piece 32, so that the current will be supplied through the coil 8 and will pass through the entire resistor R and thus be reduced in value to whatever value the total resistor R may be selected. However, as the handle 16 is moved further, it will stay in contact with contact piece 20, but will progressively engage contact pieces 31, 30 and 29 to progressively exclude sections of the resistor R, and thus increase the current which is supplied to the coil 8 to thereby increase the magnetic field in this coil.

The operation of my device is as follows:

Assuming that the arc is to be struck between the starting end of the pipe 1, the electrode wire 2 will be brought into engagement with the pipe metal 1 and drawn slightly away therefrom, thus striking the arc at this point. However, the metal of the pipe 1 at this time is cold and requires that the arc shall be maintained at this point for a greater length of time than will be necessary to hold the arc at any one point, and further along the weld. Since it is desirable that the movement between the pipe 1 and the electrode 2 should be uniform, the desired additional time element necessary to bring the metal up to the desired heat may be accomplished by so operating the switch 15 as to provide a rearwardly deflected arc so that though the electrode metal may advance relative to the end of the pipe 1, the arc will be blown rearwardly to hold the arc near the end of the pipe for the desired time. However, after the arc is started, the heat surrounding the particular point welded at any given instant will be conveyed to other parts of the metal pipe so as to give the effect of preheating of the metal prior to the approach of the electrode to the perpendicular above any given point used. It is no longer necessary to hold the arc at the given point for the additional length of time. Hence, after the weld is started, the switch 15 may be moved to its opposite position to reverse the polarization of the magnetic field and tend to blow the arc forward. The combination of the movement of the electrode forward along the pipe has an additional tendency to cause the arc to normally trail the perpendicular between the electrode metal and the pipe so that by providing the auxiliary magnetic field, this tendency can be overcome so that the arc will be substantially directed along the perpendicular and therefore will concentrate the heat at the perpendicular where it has the greatest effect, or if it is desired, the arc may be blown slightly forward to cause the weld to slightly advance beyond the perpendicular. By permitting variable control of the strength of the magnetic field of the coil 8, the amounts of trailing, or the amounts of lead of the arc relative to the perpendicular, may be selectively controlled to provide the most efficient results.

Figure 2:
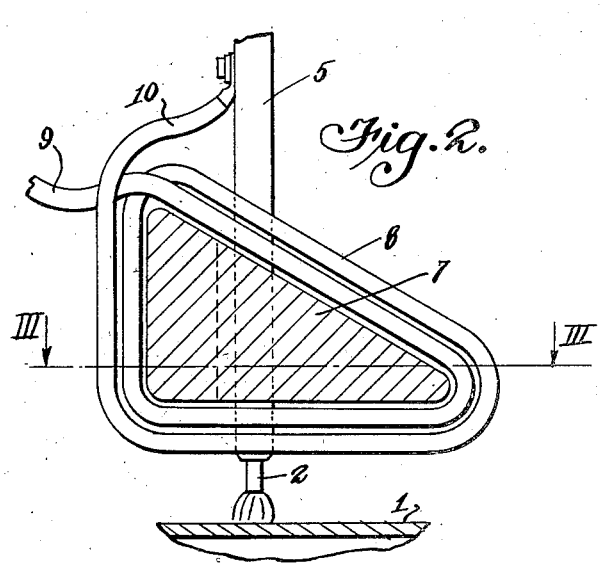
Fig. 2 is a detail, sectional view, taken along line II—II of Fig. 1.

By referring, particularly, to Fig. 2, it will be observed that the core 7 is constructed substantially triangular in vertical cross section, this shaping being desirable to reduce the enclosing of the arc to thereby permit the operator of the welding machine to more readily see the arc and to continually inspect the weld as it is formed.

While I have illustrated and described the preferred embodiment of my invention, I do not desire to be limited to any of the details of construction defined herein, except as set forth in the appended claims.

I claim:

1. In an automatic electric arc welding machine, an electrode, material to be welded, means for moving said electrode and said material relative to each other to form a continuous line of weld, means for producing an auxiliary magnetic field directed across the arc between the electrode and the metal to be welded in a direction transverse to the line of said weld, said magnetic field producing means comprising a core of magnetic material extending substantially around said electrode, a coil on said core, and auxiliary pole pieces for directing the magnetic field from said core to a position adjacent the arc between the electrode and the metal to be welded.

2. In an automatic electric arc welding machine, an electrode, material to be welded, means for moving said electrode and said material relative to each other to form a continuous line of weld, means for producing an auxiliary magnetic field directed across the arc between the electrode and the metal to be welded in a direction transverse to the line of said weld, means for selectively controlling the polarity of said magnetic field and for variably controlling the strength of said magnetic field.

3. In an automatic electric arc welding machine, an electrode, material to be welded, means for moving said electrode and said material relative to each other to form a continuous line of weld, means for producing an auxiliary magnetic field directed across the arc between the electrode and the metal to be welded in a direction transverse to the line of said weld, said magnetic field producing means comprising a substantially U-shaped magnetic core, means mounting said core to straddle said electrode and extending with its major axis parallel to the line of said weld, and a coil wound on said core upon an axis transverse to the line of said weld.

LUTHER J. KINNARD.